(12) United States Patent
Eichelmann et al.

(10) Patent No.: US 12,258,231 B2
(45) Date of Patent: Mar. 25, 2025

(54) COMBINATION OF A DISPENSER FOR DISPENSING PORTIONS OF SEALING MATERIAL WITH A SEALING MATERIAL

(71) Applicant: Henkel AG & Co. KGaA, Duesseldorf (DE)

(72) Inventors: Holger Eichelmann, Hilden (DE); Norbert Bialas, Dormagen (DE); Massimiliano Casali, Pavia (IT); Peter O'Sullivan, Wicklow (IE); Rudolf Neumayer, Grosskarolinenfeld (DE); Udo Hinterseer, Wattersdorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 493 days.

(21) Appl. No.: 17/301,646

(22) Filed: Apr. 9, 2021

(65) Prior Publication Data

US 2021/0221631 A1 Jul. 22, 2021

Related U.S. Application Data

(63) Continuation of application No. PCT/EP2019/077564, filed on Oct. 11, 2019.

(30) Foreign Application Priority Data

Oct. 18, 2018 (EP) .................................... 18201345

(51) Int. Cl.
*B32B 3/26* (2006.01)
*B65H 1/04* (2006.01)

(52) U.S. Cl.
CPC ................ *B65H 1/04* (2013.01); *B32B 3/266* (2013.01); *Y10T 428/15* (2015.01)

(58) Field of Classification Search
None
See application file for complete search history.

(56) References Cited

U.S. PATENT DOCUMENTS 3,002,770 A 10/1961 Chesnut et al.
3,470,781 A 10/1969 Domeny
(Continued)

FOREIGN PATENT DOCUMENTS

CN 107487654 A 12/2017
DE 19731430 A1 * 1/1999 ........... B65H 35/006
(Continued)

OTHER PUBLICATIONS

Machine translation of DE19731430A1 (Year: 2024).*
International Search Report for International PCT Application No. PCT/EP2019/077564 dated Dec. 13, 2019.

*Primary Examiner* — Alexander S Thomas
(74) *Attorney, Agent, or Firm* — Mary K. Cameron (57) ABSTRACT

A combination of a dispenser for dispensing portions of sealing material and a sealing material in the form of a flexible film, wherein the sealing material comprises polytetrafluoroethylene film having the following parameters:
a film thickness of 50 to 500 μm;
a density between 1.20 and 1.80 g/cm3;
a longitudinal strength of more than 11 N/mm2;
a transversal strength of more than 2 N/mm2;
a longitudinal elongation of more than 200%; and
a transversal elongation of more than 1000%.

12 Claims, 8 Drawing Sheets

(56) References Cited

U.S. PATENT DOCUMENTS

| | | | |
|---|---|---|---|
| 4,012,273 A | * | 3/1977 | Inka .................... B65H 35/002 |
| | | | 156/577 |
| 5,569,507 A | | 10/1996 | Goodwin et al. |
| 2005/0215148 A1 | | 9/2005 | Werner |
| 2013/0233962 A1 | | 9/2013 | Wells |
| 2013/0280531 A1 | | 10/2013 | Thornton et al. |
| 2017/0313921 A1 | | 11/2017 | Bachmair et al. |

FOREIGN PATENT DOCUMENTS

| DE | 102011012938 A1 | 2/2012 |
|---|---|---|
| EP | 3124206 A1 | 2/2017 |
| WO | 2016065380 A1 | 5/2016 |

\* cited by examiner

COMBINATION OF A DISPENSER FOR DISPENSING PORTIONS OF SEALING MATERIAL WITH A SEALING MATERIAL

The present invention relates to a combination of a dispenser for dispensing portions of sealing material with a sealing material in the form of a flexible film.

Sealing materials in the form of flexible films are for example used to seal threaded pipe joints. Such sealing materials are typically formed as a roll and cut to the desired length. A sealing material in the form of the flexible film made of polytetrafluoroethylene (PTFE) is disclosed in WO 2016/065380A1.

It is an object of the present invention, to provide a combination of a dispenser for dispensing portions of sealing material with a sealing material in the form of a flexible film comprising polytetrafluoroethylene, which is in particular suited to dispensing a sealing material for threaded pipe joints or other sealing applications.

This object is achieved by means of a combination of the dispenser for dispensing portions of sealing material with a sealing material in the form of a flexible film according to claim 1.

Advantageous embodiments and developments are objects of the dependent claims.

According to a first aspect of the invention, a combination of a dispenser for dispensing portions of sealing material with the sealing material in the form of a flexible film, wherein the sealing material comprises polytetrafluoroethylene and is characterized by the following parameters:
  it comprises a film thickness of 50 to 500 µm;
  it has a density between 1.20 and 1.80 g/cm3;
  it has a longitudinal strength of more than 11 N/mm2;
  it has a transversal strength of more than 2 N/mm2;
  it has a longitudinal elongation of more than 200%;
  it has a transversal elongation of more than 1000%.

It has been found, that a sealing material comprising polytetrafluoroethylene and being characterized by the above-mentioned parameters is particularly well suited for sealing threaded pipe joints and for being dispensed from a dispenser. In particular, the above-mentioned parameters make it possible to store the sealing material in the dispenser and to easily and comfortably dispense desired portions of the sealing material from the dispenser.

The dispenser allows for economically dispensing sealing material of a suitable size which is ready to use. The dispenser can be adjusted to the intended use to dispense a certain size and shape of sealing material. For example, for pipes with a diameter of 1" up to 1¼", one stripe of sealing material with a size of 20 mm×180 mm may be suitable. For pipes with a diameter of 1½" up to 2", one stripe of sealing material with a size of 40 mm×180 mm and folding one time along the perforation line may be suitable, which is the equivalent of two stripes material with a size of 20 mm×180 mm. For pipes with a diameter of 2¼" up to 3", one stripe of sealing material with a size of 60 mm×180 mm and folding two times along the perforation line may be suitable, which is the equivalent of three stripes material with a size of 20 mm×180 mm.

In particular, the sealing material may comprise a film thickness of 100 to 250 µm, preferably of 150 to 200 µm. It may have a density between 1.50 and 1.70 g/cm3. Furthermore, it may have a longitudinal elongation of more than 300%.

The dispenser can have different forms and may for example be a rectangular box or a round or hexagonal container. It may be made of aluminum, magnesium, stainless steel, brass, chromed brass, carbon fiber or plastic.

According to an embodiment of the invention, the sealing material is an undrawn polytetrafluoroethylene. This has more isotropic properties than a drawn PTFE.

The sealing material may comprise additives with a lamellar crystal structure. In particular, the sealing material may comprise talc as additive, which is a high pressure lubricant.

It has been found, that a sealing material comprising between 0.5 wt.-% (weight percent) to 2.0 wt.-% talc is particularly advantageous in the application of sealing threaded pipes or similar parts.

According to an embodiment of the invention, the dispenser comprises cutting means for cutting off portions of sealing material. These cutting means may be suitable to completely cut the sealing material and or two help separate portions of sealing material already divided from each other by perforated areas or to separate single portions of precut sealing material from each other which are connected by some connecting means. The cutting means may in particular be a blade or a sharp edge.

According to an embodiment, the dispenser comprises means to define the size of portions of sealing material to be cut off before the cutting means is operated. The means to define the size of portions of sealing material may for example be a means to adjust the size of an opening of the dispenser, means for adjusting the blade of a cutting means or means for ensuring that a certain length of sealing material is dispensed, e.g. a locking spring.

The means to define the size of portions of sealing material to be cut off may also comprise a scale suitable to determine the size of portions of sealing material to be cut off.

According to an embodiment of the invention, the flexible film of sealing material is perforated to form predetermined portions of sealing material. The perforation could in particular be made by needle or laser perforation.

This embodiment has the advantage, that dispensing suitable portions of sealing material from the dispenser is particularly easy and can be potentially done with one hand, which makes handling of the dispenser exceptionally comfortable.

The arrangement of the perforations of the film can be in parallel or non-parallel rows and/or columns. They can also be non-straight, rhombic, rectangular, square, or hexagonal. According to one embodiment, the perforation is in parallel rows, the distance between rows being between 5 to 80 mm, the distance being preferably 5 mm or 10 mm or 20 mm.

According to an alternative embodiment of the invention, the flexible film of sealing material is precut into single sheets which are dispensed individually. According to this embodiment, the portions of sealing material to be dispensed are precut single sheets of a certain, predetermined size. This has the advantage, that the sealing material can be dispensed very easily.

The single sheets may be connected to adjacent sheets by connecting means. The single sheets could for example be crimped without any auxiliary means, connected by an adhesive or connected by clamping means.

According to an embodiment of the invention, the dispenser comprises means for bringing the next sheet of sealing material to be dispensed in a dispensing position. These might for example be means to bring the next sheet of sealing material forward to an opening of the dispenser.

According to an embodiment of the invention, the flexible film of sealing material is formed as a roll and stored in the dispenser. The flexible film of sealing material may for example be wound around a guiding device of the dispenser.

Alternatively, the flexible firm of sealing material may be formed as a stack and stored in the dispenser. In particular, the flexible film may be z-folded along perforation lines to form a stack.

To form a stack, the film may be cut to a multiple length of 2 m, e.g. 12 m, and folded z-wise along the perforation lines. The width of the film stack is 50 to 220 mm, preferably 100 to 200 mm, more preferably about 180 mm.

The dispenser may comprise a container for receiving a dispensing quantity of sealing material as a well as a refill quantity of sealing material.

The container may also comprise a lamp, for example in LED, and/or an electronic device such as an RFID-label or QR-code to support the user with application information or electronic order for refill material.

Further advantages, advantageous embodiments and developments of the combination of the dispenser and the sealing material will become apparent from the exemplary embodiments which are described below in association with the schematic figures.

Figure 1:
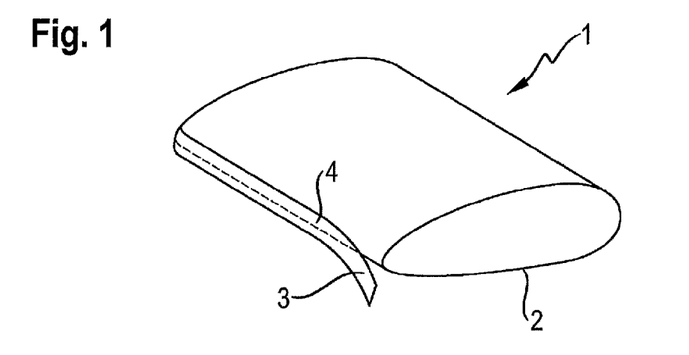
FIG. 1 shows a combination of a dispenser and a sealing material according to a first embodiment of the invention.

FIG. 1 shows a combination 1 of a dispenser 2 with a sealing material 3 in the form of a sheet-like film. The dispenser 2 according to the first embodiment comprises a container with an oval cross-section which has an opening on one side which is not shown in detail in FIG. 1. The opening comprises an edge 4 which extends across the whole width of the dispenser 2 and may serve as a cutting means for cutting off portions of sealing material 3.

Figure 2:
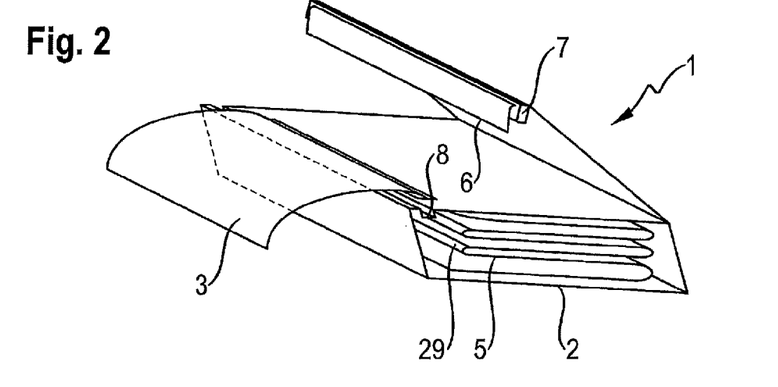
FIG. 2 shows a combination of a dispenser and a sealing material according to a second embodiment of the invention.

FIG. 2 shows a combination 1 of a dispenser 2 and a sealing material 3 according to a second embodiment. According to this embodiment, the sealing material 3 is in the form of a stack 5 with the sealing material 3 z-folded along perforation lines 29. The stack 5 of sealing material 3 is received in the dispenser 2 which is a square container with a lid 6 which has a protrusion 7 fitting into a recess 8 to cut or separate individual portions of sealing material 3.

Figure 3:
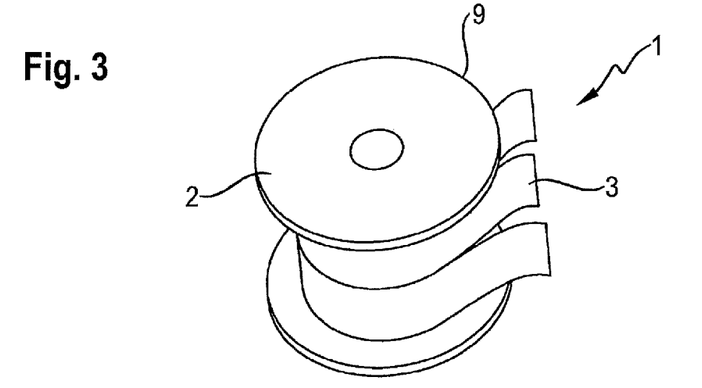
FIG. 3 shows a combination of a dispenser and a sealing material according to a third embodiment of the invention.

FIG. 3 shows a combination 1 of a dispenser 2 and a sealing material 3 according to a third embodiment. According to this embodiment, the dispenser 2 comprises a bobbin 9 which can receive a number of single rolls of sealing material 3 in the form of a tape. This has the advantage, that multiple rolls of sealing material 3 can be connected together for a larger width. The bobbin 9 could be inserted in a container (not shown) comprising a cutting means.

Figure 4:
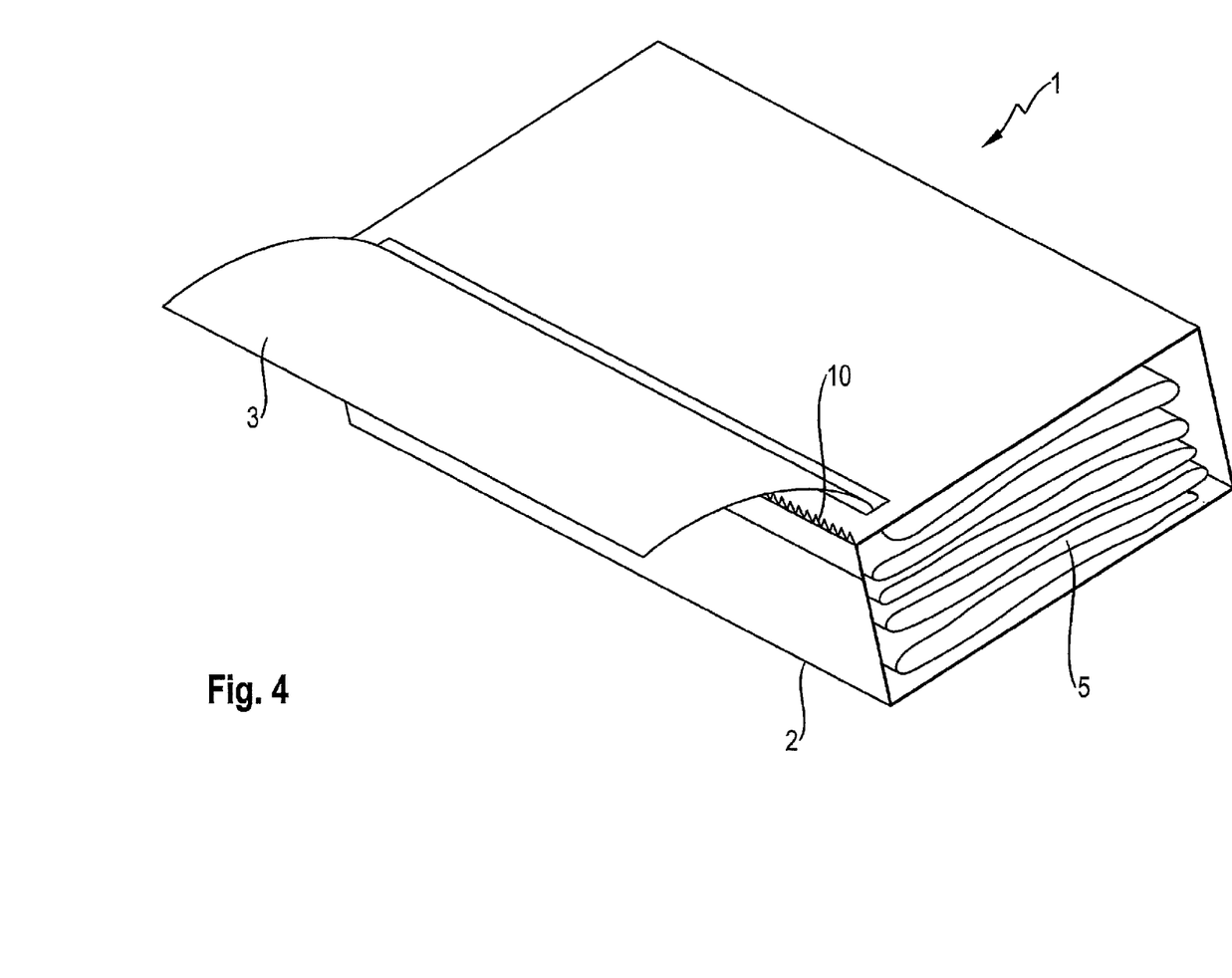
FIG. 4 shows a combination of a dispenser and a sealing material according to a fourth embodiment of the invention.

FIG. 4 shows a combination 1 of a dispenser 2 and a sealing material 3 according to a fourth embodiment.

This embodiment differs from the second embodiment shown in FIG. 2 in that it has sharp edge 10 on the upper side functioning as a cutting means to cut portions of sealing material 3. The sealing material 3 may be perforated to allow for easy ripping.

Figure 5:
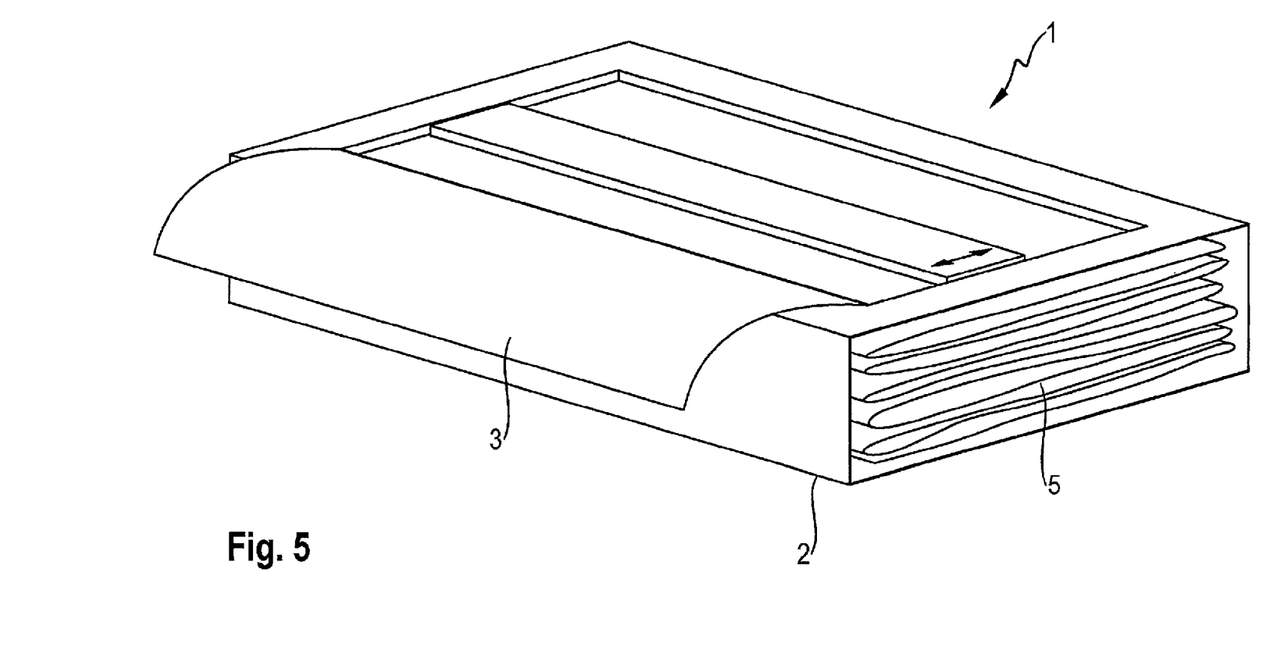
FIG. 5 shows a combination of a dispenser and a sealing material according to a fifth embodiment of the invention.
Figure 6:
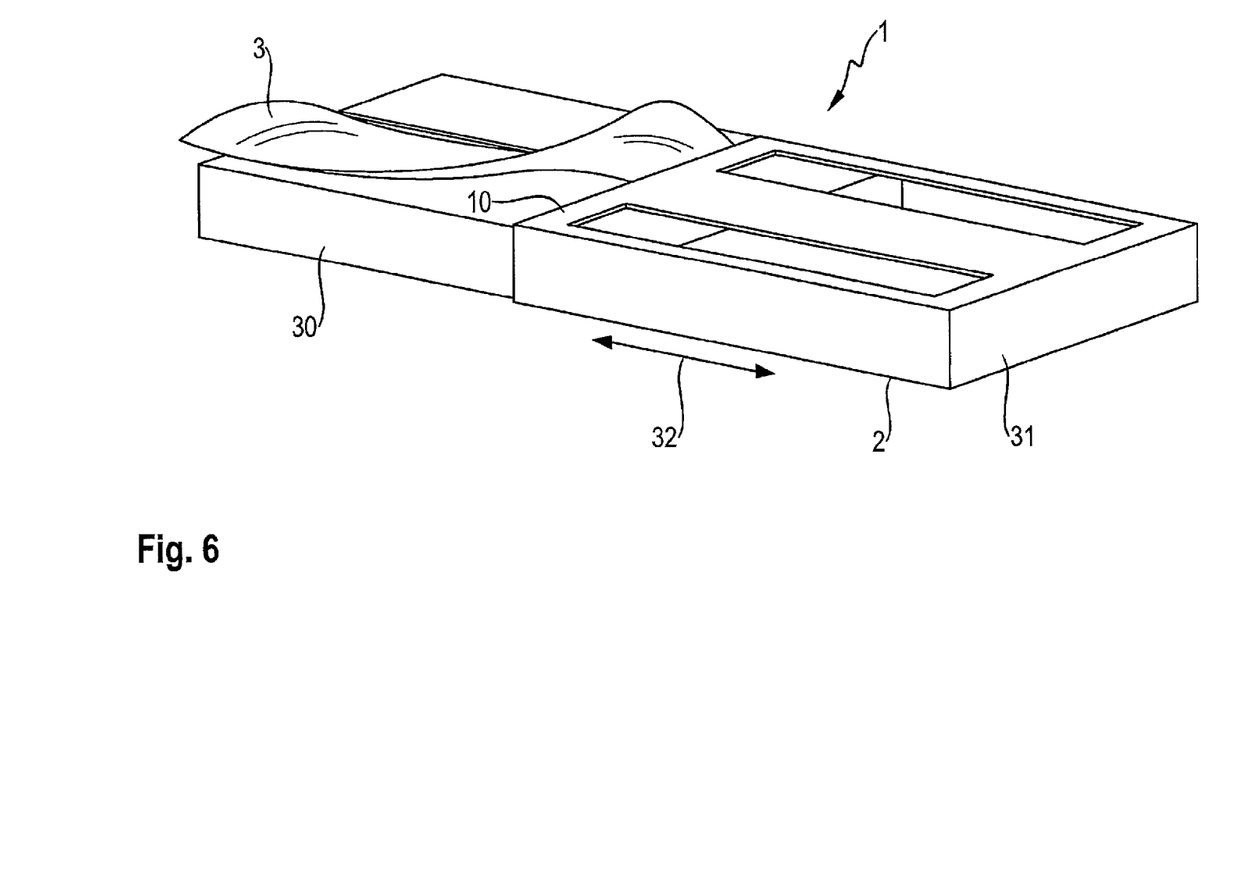
FIG. 6 shows a second view of the fifth embodiment shown in FIG. 5.

FIGS. 5 and 6 show a fifth embodiment of a combination 1 of a dispenser 2 and a sealing material 3. The dispenser 2 according to this fifth embodiment comprises an inner part 30, which receives a stack 5 of sealing material 3, and an outer part 31, which may slide over the inner part 30 as indicated by the arrow 32 to close the dispenser 2. To separate individual portions of sealing material 3 from the stack 5 contained in the inner part 30, the sealing material 3 is cut on the sharp edge 10 of the outer part 31.

Figure 7:
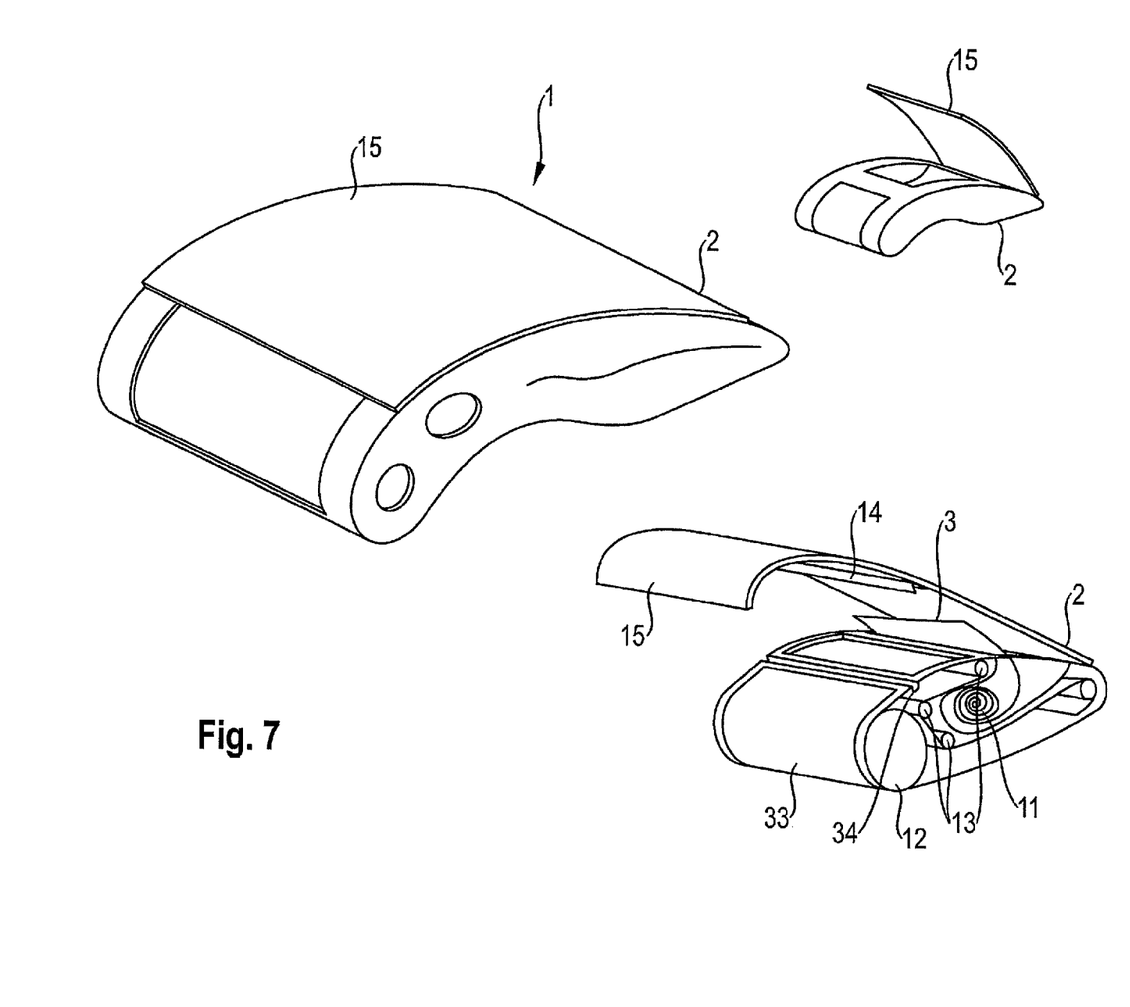
FIG. 7 shows a combination of a dispenser and a sealing material according to a sixth embodiment of the invention.

FIG. 7 shows several views of a sixth embodiment of a combination 1 of the dispenser 2 and a sealing material 3. According to this embodiment, the dispenser comprises a container with a lid 15, the container receiving a roll 11 of sealing material 3. According to this embodiment, the sealing material 3 is transported inside the container and pushed out of the container by a number of rollers 13. A front roller 12 rotates a rubber band 33 to push the sealing material 3 forward and out of the dispenser 2. A cutting blade 14 interacting with a corresponding cutting clamp 34 serves to cut portions of the sealing material 3.

Figure 8:
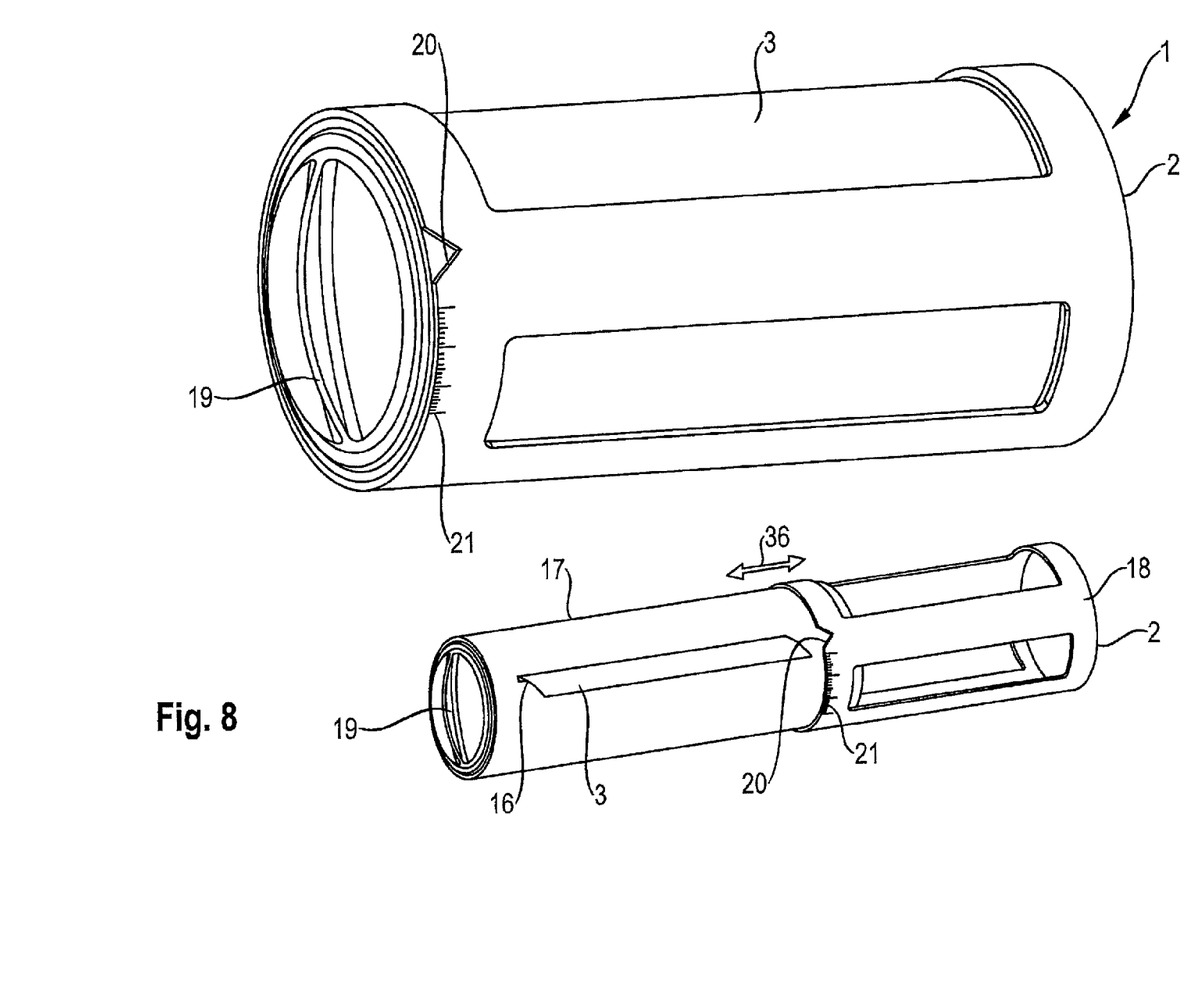
FIG. 8 shows a combination of a dispenser and a sealing material according to a seventh embodiment of the invention.

FIG. 8 shows a seventh embodiment of a combination 1 of the dispenser 2 and a sealing material 3. According to this embodiment, the dispenser 2 comprises an inner part 17 and an outer part 18 which is able to slide over the inner part 17 as indicated by the arrow 36.

The inner part 17 has an opening 16 where sealing material 3 can be dispensed from. Sealing material 3 is stored inside the inner part 17 in a roll and dispensed by turning the twisting knot 19 and by cutting the desired length of sealing material 3 with the help of the blade 20. The dispenser 2 may comprise a locking device, e.g. a locking spring, to hold the sealing material 3 at the desired length when dispensed from the dispenser 2. According to this embodiment, the dispenser 2 has a scale 21 which helps determine the amount of sealing material 3 dispensed from the dispenser 2.

Figure 9:
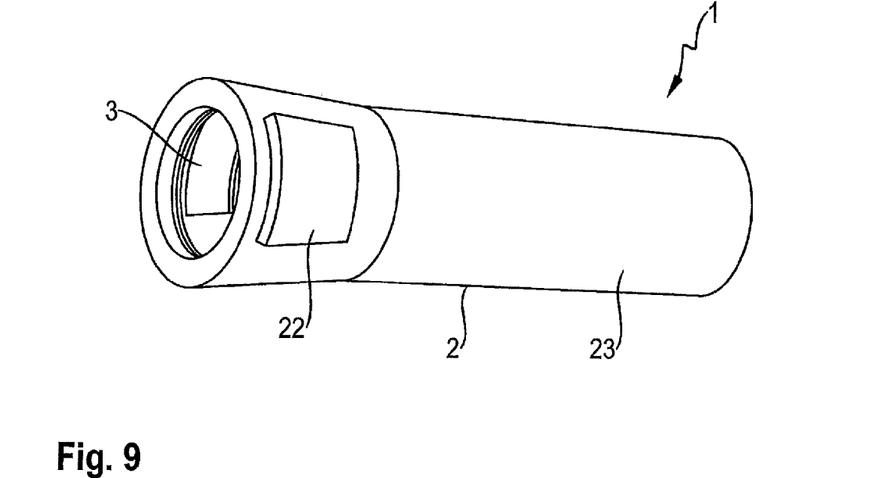
FIG. 9 shows a combination of a dispenser and a sealing material according to an eighth embodiment of the invention.

FIG. 9 shows an eighth embodiment of a combination 1 of a dispenser 2 and a sealing material 3. According to this embodiment, the dispenser 2 has a refill compartment 23 where a quantity of rolls of sealing material 3 can be stored. Sealing material 3 is dispensed from the dispenser 2 by pressing the tension knob 22.

Figure 10:
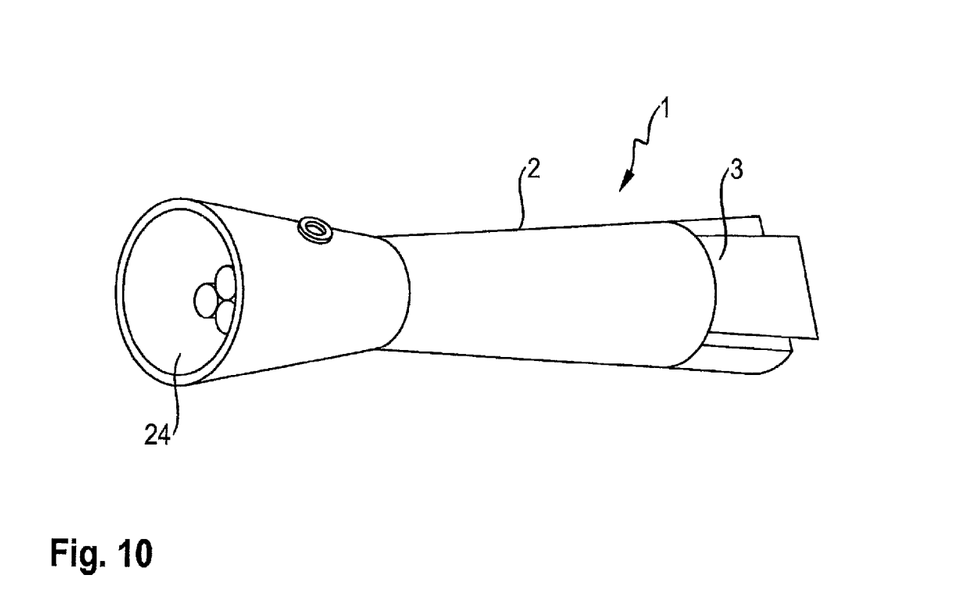
FIG. 10 shows a combination of a dispenser and a sealing material according to a ninth embodiment of the invention.

FIG. 10 shows a ninth embodiment of a combination 1 of a dispenser 2 and a sealing material 3. According to this embodiment, the dispenser 2 also has a light 24, for example in LED, and can thus also function as a torch.

Figure 11:
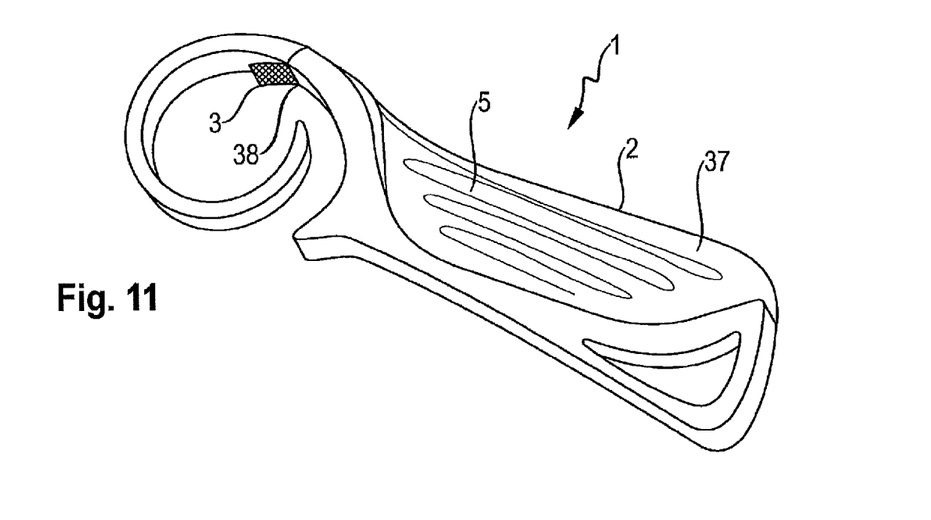
FIG. 11 shows a combination of a dispenser and a sealing material according to a tenth embodiment of the invention and FIG. 12 shows a combination of a dispenser and a sealing material according to a eleventh embodiment of the invention.

FIG. 11 shows a 10th embodiment of a combination 1 of a dispenser 2 and a tape of sealing material 3. The sealing material 3 is stored in a fanned stack 5 in a compartment 37 of the dispenser 2. The compartment 37 may be transparent to allow for the inspection of the amount of sealing material 3 still left in the compartment 37. The sealing material 3 is dispensed through an opening 38 which can have an edge functioning as a cutting means.

Figure 12:
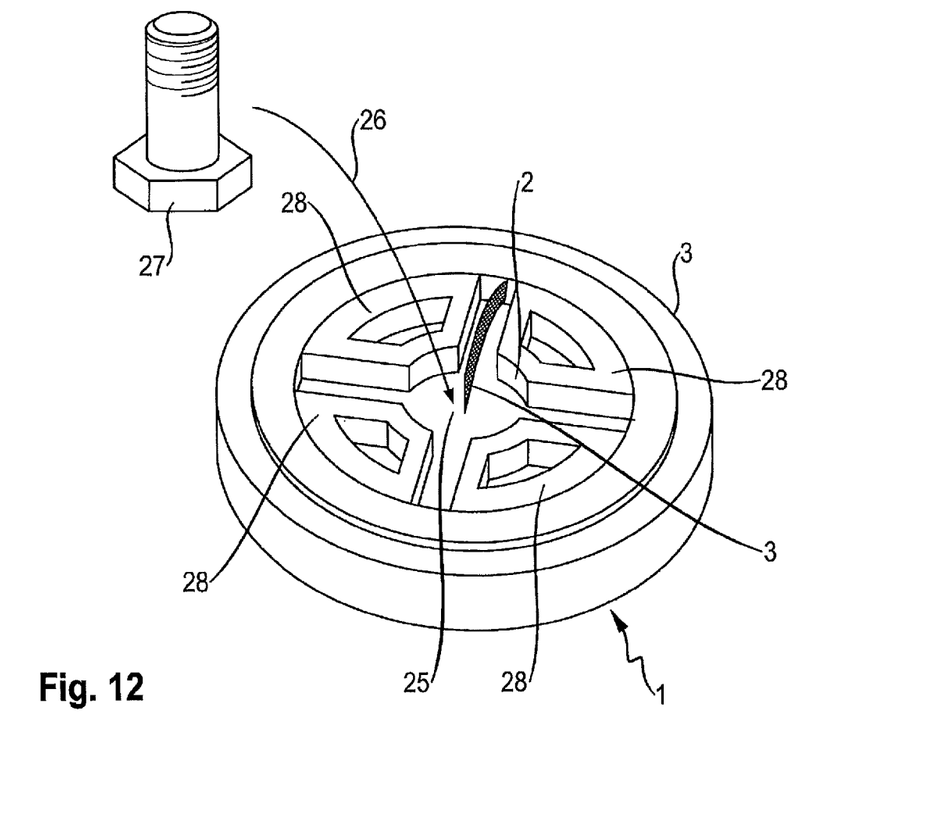

FIG. 12 shows an eleventh embodiment of a combination 1 between a dispenser 2 and a sealing material 3 in the form of a tape. According to this embodiment, the dispenser 2 comprises a bobbin-like structure which receives a cartridge of sealing material 3 and which has a central opening 25 which receives a bolt 27 as indicated by the arrow 26. The bolt 27 compresses tension structures 28 around the central opening 25 and thereby adds pressure to the tape of sealing material 3, allowing it to stretch around the bolt 27 as it is turned.

LIST OF REFERENCE SIGNS 1 combination
2 dispenser
3 sealing material
4 edge
5 stack
6 lid
7 protrusion
8 recess
9 bobbin
10 sharp edge
11 roll
12 front roller
13 roller
14 cutting blade
15 lid
16 opening
17 inner part
18 outer part
19 twisting knob
20 blade
21 scale
22 tension knob
23 refill compartment
24 light
25 central opening
26 arrow
27 bolt
28 tension structure
29 perforation line
30 inner part
31 outer part
32 arrow
33 rubber band
34 cutting clamp
36 arrow
37 compartment
38 opening

The invention claimed is:

1. Combination of a dispenser for dispensing portions of sealing material with a sealing material in the form of a flexible film, wherein the dispenser comprises cutting means for cutting off portions of sealing material and wherein the sealing material is perforated to form predetermined portions of sealing material and comprises polytetrafluoroethylene and has the following parameters:
a film thickness of 50 to 500 μm;
a density between 1.20 and 1.80 g/cm3;
a longitudinal strength of more than 11 N/mm2;
a transversal strength of more than 2 N/mm2;
a longitudinal elongation of more than 200%; and
a transversal elongation of more than 1000%.

2. The combination according to claim 1, wherein the sealing material comprises undrawn polytetrafluoroethylene.

3. The combination according to claim 1, wherein the sealing material comprises additives with a lamellar crystal structure.

4. The combination according to claim 1, wherein the sealing material comprises talc as an additive.

5. The combination according to one claim 4, wherein the sealing material contains between 0.5 wt.-% to 2.0 wt.-% talc.

6. The combination according to claim 1, wherein the dispenser comprises means to define the size of portions of sealing material to be cut off before the cutting means is operated.

7. The combination according to claim 1, wherein the flexible film of sealing material is formed as a roll and stored in the dispenser.

8. The combination according to claim 7, wherein the flexible film sealing material is wound around a guiding device of the dispenser.

9. The combination according to claim 1, wherein the dispenser comprises a container for receiving a dispensing quantity of sealing material as well as a refill quantity of sealing material.

10. The combination according to claim 1, wherein the dispenser comprises a container including a quantity of sealing material arranged for dispensing as well as a refill quantity of sealing material.

11. The combination according to claim 1, wherein the dispenser comprises a scale configured to indicate an amount of the sealing material dispensed from the dispenser.

12. A combination of a dispenser for dispensing portions of sealing material and a flexible polytetrafluoroethylene film sealing material arranged for dispensing by the dispenser, wherein the polytetrafluoroethylene film sealing material is perforated to form predetermined portions of sealinq material and has the following parameters:
a film thickness of 50 to 500 μm;
a density between 1.20 and 1.80 g/cm3;
a longitudinal strength of more than 11 N/mm2;
a transversal strength of more than 2 N/mm2;
a longitudinal elongation of more than 200%; and
a transversal elongation of more than 1000%.

* * * * *